US009466108B1

(12) United States Patent
Chen et al.

(10) Patent No.: US 9,466,108 B1
(45) Date of Patent: Oct. 11, 2016

(54) METHOD AND APPARATUS FOR MULTIPLE IMAGE REGISTRATION IN THE GRADIENT DOMAIN

(71) Applicant: Nokia Technologies OY, Espoo (FI)

(72) Inventors: Xin Chen, Evanston, IL (US); Junzhou Huang, Grapevine, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/673,923

(22) Filed: Mar. 31, 2015

(51) Int. Cl.
*G06K 9/36* (2006.01)
*G06T 7/00* (2006.01)
*G06T 11/60* (2006.01)
*G06K 9/62* (2006.01)

(52) U.S. Cl.
CPC ........... *G06T 7/0024* (2013.01); *G06K 9/6202* (2013.01); *G06T 11/60* (2013.01)

(58) Field of Classification Search
CPC . G06T 7/0028; G06T 7/0026; G06T 7/0024; G06T 7/0034; G06T 3/4038; G06K 9/32
See application file for complete search history.

(56) References Cited

U.S. PATENT DOCUMENTS

| | | | |
|---|---|---|---|
| 6,621,929 B1 | 9/2003 | Lai et al. | |
| 7,680,312 B2* | 3/2010 | Jolly | G06T 7/0083 382/128 |
| 8,818,038 B2* | 8/2014 | Peleg | G06F 17/3079 382/103 |
| 9,113,043 B1* | 8/2015 | Kim | H04N 13/02 |
| 2003/0053667 A1 | 3/2003 | Paragios et al. | |
| 2003/0235337 A1 | 12/2003 | Paragios et al. | |
| 2006/0013482 A1 | 1/2006 | Dawant et al. | |
| 2008/0170791 A1 | 7/2008 | Eskildsen et al. | |
| 2008/0316202 A1* | 12/2008 | Zhou | G06T 17/20 345/419 |
| 2009/0080779 A1* | 3/2009 | Chefd'hotel | G06K 9/32 382/209 |
| 2010/0049451 A1 | 2/2010 | Lu et al. | |
| 2010/0111386 A1 | 5/2010 | El-Baz | |
| 2011/0176746 A1* | 7/2011 | Bucki | G06T 7/0024 382/293 |
| 2011/0310084 A1* | 12/2011 | Umezaki | G09G 3/3208 345/213 |
| 2012/0039532 A1* | 2/2012 | Chao | G06T 1/20 382/168 |
| 2012/0110491 A1 | 5/2012 | Cheung | |
| 2013/0051685 A1 | 2/2013 | Shechtman et al. | |
| 2013/0201450 A1 | 8/2013 | Bailey et al. | |
| 2014/0071125 A1 | 3/2014 | Burlina et al. | |
| 2014/0126834 A1 | 5/2014 | Jiang et al. | |

OTHER PUBLICATIONS

Modersitzki, Jan, "Numerical Methods for Image Registration," *Numerical Mathematics and Scientific Computation*; Copyright 2004; 109 pages.
Aristeidis Sotiras, Christos Davatzikos, and Nikos Paragios, "Deformable medical image registration: A survey," *IEEE Transactions on Medical Imaging*, vol. 32, No. 7, pp. 1153-1190, 2013.
JB Maintz and Max A Viergever, "A Survey of medical image registration," *Medical image analysis*, vol. 2, No. 1, pp. 1-36, 1998.

(Continued)

*Primary Examiner* — Amir Alavi
(74) *Attorney, Agent, or Firm* — Alston & Bird LLP (57) ABSTRACT

A method, apparatus and computer program product are provided for image registration in the gradient domain. A method is provided including receiving three or more input images and registering, simultaneously, the three or more input images in the gradient domain based on applying an energy minimization function.

17 Claims, 9 Drawing Sheets

(56) References Cited

OTHER PUBLICATIONS

Paul Viola and William M Wells III, "Alignment by maximization of mutual information," *International Journal of Computer Vision*, vol. 24, No. 2, pp. 137-154, 1997.

Andriy Myronenko and Xubo Song, "Intensity-based image registration by minimizing residual complexity," *IEEE Transactions on Medical Imaging*, vol. 29, No. 11, pp. 1882-1891, 2010.

Jan Modersitzki and Stefan Wirtz, "Combining homogenization and registration," *in Biomedical Image Registration*, pp. 257-263. 2006.

Boaz Cohen and Itshak Dinstein, "New maximum likelihood motion estimation schemes for noisy ultrasound images," *Pattern Recognition*, vol. 35, No. 2, pp. 455-463, 2002.

Andriy Myronenko, Xubo Song, and David J Sahn, "Maximum likelihood motion estimation in 3d echocardiography through nonrigid registration in spherical coordinates," *in Functional Imaging and Modeling of the Heart*, pp. 427-436. 2009.

Deanna Needell and Rachel Ward, "Stable image reconstruction using total variation minimization," *SIAM Journal on Imaging Sciences*, vol. 6, No. 2, pp. 1035-1058, 2013.

Noppadol Chumchob, "Vectorial total variation-based regularization for variational image registration," *IEEE Transactions on Image Processing*, vol. 22, No. 11, 2013. pp. 4551-4559.

Claudia Frohn-Schauf, Stefan Henn, and Kristian Witsch, "Multigrid based total variation image registration," *Computing Visualization in Science*, vol. 11, No. 2, pp. 101-113, 2008.

Daniel Rueckert, Luke I Sonoda, Carmel Hayes, Derek LG Hill, Martin O Leach, and David J Hawkes, "Nonrigid registration using freeform deformations: application to breast MR images," *IEEE Transactions on Medical Imaging*, vol. 18, No. 8, pp. 712-721, 1999.

Chris A Cocosco, Vasken Kollokian, Remi K-S Kwan, G Bruce Pike, and Alan C Evans, "Brainweb: Online interface to a 3d MRI simulated brain database," *NeuroImage*, May 1997;5(4):S425.

Fr'ed'eric Zana and Jean-Claude Klein, "A multimodal Registration algorithm of eye fundus images using vessels detection and hough transform," *IEEE Transactions on Medical Imaging*, vol. 18, No. 5, pp. 419-428, 1999.

Office Action for U.S. Appl. No. 14/635,027 dated Mar. 29, 2016.

Demirovic, D. et al., *Total Variation Filtered Demons for Improved Registration of Sliding Organs*, Hindawi, ISRN Biomathematics, vol. 2013, article ID 534891, 7 pages.

Cachier, P. et al., *Iconic feature based nonrigid registration: the PASHA algorithm*, Computer Vision and Image Uderstading 89 (2003) 272-298.

* cited by examiner

METHOD AND APPARATUS FOR MULTIPLE IMAGE REGISTRATION IN THE GRADIENT DOMAIN

TECHNOLOGICAL FIELD

An example embodiment of the present invention relates to simultaneous multi-image registration and, more particularly, to simultaneous multi-image registration in the gradient domain.

BACKGROUND

There is a large disparity between composite images based on image registration. The composite images may have significantly different appearances due to intensity variation of the images used to generate the composite images. For example, satellite and aerial images taken of the same object may have markedly different intensities, at different times of day, different seasons of the year, different image angles, different altitudes; different image capture systems, or the like. In some fields such as medical imaging or biometrics, image alignment is critical for diagnosis and identification. However, images of the same object when examined at a detailed level may not be properly aligned due to intrinsic and extrinsic variation.

Image registration aims to find the geometrical transformation to align two or more images into the same coordinate system. Geometric transformations have typically been estimated as rigid, piecewise-rigid, or non-rigid. Non-rigid is the most complex. Some existing methods of image registration can be classified based on the variables used in non-rigid registration, into feature-based registration and intensity-based registration.

Many non-rigid techniques have been proposed, most of which are based on minimizing an energy function containing a distance, or similarity, measure and a regularization term. The regularization may encourage certain types of transformations related to different applications and the minimum distance may correspond to a correct spatial alignment.

One type of distance measure is based on mutual information (MI) of images. However, in many applications, the intensity fields of the images may differ significantly. For example, slow varying intensity bias fields often exist in brain magnetic resonance images; and in temporal registration of retina images, the images may contain severe intensity artifacts. As a result, many of the existing intensity based distance measures are not robust to these intensity distortions. There are also methods for simultaneous registration and intensity correction, but they may involve much high computational complexity and suffer from multiple local minima.

Recently, the sparsity-inducing similarity measures have been repeatedly successful in overcoming such registration difficulties. In RASL (robust alignment by sparse and low-rank decomposition), the images are vectorized to form a data matrix. The transformations are estimated to seek a low rank and sparse representation of the aligned images. Two online alignment methods, ORIA (online robust image alignment) and t-GRASTA (transformed Grassmannian robust adaptive subspace tracking algorithm), are proposed to improve the scalability of RASL. All of these methods assume that the large errors among the images are sparse (e.g., caused by shadows, partial occlusions) and separable. However, many real-world images contain severe spatially-varying intensity distortions. These intensity variations are not sparse and therefore difficult to be separated by these methods. As a result, the above measures may fail to find the correct alignment and thus are less robust in these challenging tasks.

BRIEF SUMMARY

A method, apparatus and computer program product are provided in accordance with an example embodiment for simultaneous multi-image registration in the gradient domain. In an example embodiment, a method is provided that includes receiving three or more input images and registering, simultaneously, the three or more input images in the gradient domain based on applying an energy minimization function.

In an example embodiment of the method, the energy minimization function is based on a low-rank approximation and sparsity. In some example embodiments of the method, registering the input images in the gradient domain includes determining registration parameters for each of the input images, for a first image registration; registering the input images based on the registration parameters; determining a gradient error associated with the first image registration; determining if the gradient error associated with the gradient error satisfies a predetermined minimization value; and generating a composite image, in an instance in which the gradient error satisfies the predetermined minimization value.

In an example embodiment of the method, the registering the input images in the gradient domain also includes incrementing the registration parameters for a second image registration, registering the input images based on the incremented registration parameters, determining the gradient error associated with the second image registration, comparing the gradient error of the first image registration to the gradient error of the second image registration, determining if a change in the gradient error between the first image registration and the second image registration satisfies a predetermined gradient change value, and generating a composite image in an instance in which the change in gradient error satisfies the predetermined gradient change value.

In some example embodiments of the method, the registering the input images in the gradient domain also includes reperforming the incrementing the registration parameters; registering the input images; determining the gradient error; and comparing the gradient errors. In an example embodiment of the method, the registration of the input images creates a gradient error, and the gradient error comprises a sparse error. In an example embodiment of the method, the registration of the input images in the gradient domain is based on an augmented Lagrange algorithm.

In another example embodiment, an apparatus is provided including at least one processor and at least one memory including computer program code, with the at least one memory and computer program code configured to, with the processor, cause the apparatus to at least receive three or more input images and register, simultaneously, the three or more input images in the gradient domain based on applying an energy minimization function.

In an example embodiment of the apparatus, the energy minimization function is based on a low-rank approximation and sparsity. In some example embodiments of the apparatus, registering the input images in the gradient domain includes determining registration parameters for each of the input images, for a first image registration; registering the input images based on the registration parameters; determining a gradient error associated with the first image registration; determining if the gradient error associated with the gradient error satisfies a predetermined minimization value; and generating a composite image, in an instance in which the gradient error satisfies the predetermined minimization value.

In some example embodiments of the apparatus, the registering the input images in the gradient domain also includes incrementing the registration parameters for a second image registration, registering the input images based on the incremented registration parameter, determining the gradient error associated with the second image registration, comparing the gradient error of the first image registration to the gradient error of the second image registration, determining if a change in the gradient error between the first image registration and the second image registration satisfies a predetermined gradient change value, and generating a composite image in an instance in which the change in gradient error satisfies the predetermined gradient change value.

In an example embodiment of the apparatus, the registering the input images in the gradient domain also includes reperforming the incrementing the registration parameters; registering the input images; determining the gradient error; and comparing the gradient errors. In some example embodiments of the apparatus, the registration of the input images creates a gradient error and the gradient error comprises a sparse error. In an example embodiment of the apparatus, the registration of the input images in the gradient domain is based on an augmented Lagrange algorithm.

In a further example embodiment, a computer program product is provided including at least one non-transitory computer-readable storage medium having computer-executable program code portions stored therein, with the computer-executable program code portions comprising program code instructions configured to receive three or more input images and register, simultaneously, the three or more input images in the gradient domain based on applying an energy minimization function.

In an example embodiment of the computer program product, the energy minimization function is based on a low-rank approximation and sparsity. In some example embodiments of the computer program product, the registering the input images in the gradient domain includes determining registration parameters for each of the input images, for a first image registration; registering the input images based on the registration parameters; determining a gradient error associated with the first image registration; determining if the gradient error associated with the gradient error satisfies a predetermined minimization value; and generating a composite image, in an instance in which the gradient error satisfies the predetermined minimization value.

In some example embodiments of the computer program product, the registering the input images in the gradient domain also includes incrementing the registration parameters for a second image registration, registering the input images based on the incremented registration parameters, determining the gradient error associated with the second image registration, comparing the gradient error of the first image registration to the gradient error of the second image registration, determining if a change in the gradient error between the first image registration and the second image registration satisfies a predetermined gradient change value, and generating a composite image in an instance in which the change in gradient error satisfies the predetermined gradient change value.

In an example embodiment of the computer program product, the registering the input images in the gradient domain also includes reperforming the incrementing the registration parameters, registering the input images; determining the gradient error; and comparing the gradient errors. In some example embodiments of the computer program product, the registration of the input images creates a gradient error and the gradient error comprises a sparse error. In an example embodiment of the computer program product, the registration of the input images in the gradient domain is based on an augmented Lagrange algorithm.

In yet a further example embodiment, an apparatus is provided including means for receiving three or more input images and means for registering, simultaneously, the three or more input images in the gradient domain based on applying an energy minimization function.

In an example embodiment of the apparatus, the energy minimization function is based on a low-rank approximation and sparsity. In some example embodiments of the apparatus, registering the input images in the gradient domain includes determining registration parameters for each of the input images, for a first image registration, registering the input images based on the registration parameters, determining a gradient error associated with the first image registration, determining if the gradient error associated with the gradient error satisfies a predetermined minimization value and generating a composite image, in an instance in which the gradient error satisfies the predetermined minimization value.

In some example embodiments of the apparatus, the registering the input images in the gradient domain also include incrementing the registration parameters for a second image registration, registering the input images based on the incremented registration parameter, determining the gradient error associated with the second image registration, comparing the gradient error of the first image registration to the gradient error of the second image registration, determining if a change in the gradient error between the first image registration and the second image registration satisfies a predetermined gradient change value, and generating a composite image in an instance in which the change in gradient error satisfies the predetermined gradient change value.

In an example embodiment of the apparatus, the registering the input images in the gradient domain also includes reperforming the incrementing the registration parameters, registering the input images; determining the gradient error; and comparing the gradient errors. In some example embodiments of the apparatus, the registration of the input images creates a gradient error and the gradient error comprises a sparse error. In an example embodiment of the apparatus, the registration of the input images in the gradient domain is based on an augmented Lagrange algorithm.

In yet another example embodiment, an apparatus is provided that includes means for receiving three or more input images. The apparatus of this example embodiment also includes means for registering, simultaneously, the three or more input images in the gradient domain based on applying an energy minimization function.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

Image gradients, or edges, may be much more stationary than image pixels under spatially varying intensity distortions. Based on image gradients a similarity measure may be utilized in accordance with an example embodiment of the present invention for intensity based image registration, which matches the edges of two images. Minimizing an energy function based on the matched edges encourages the edges of the residual, e.g. composite, image to be sparse, e.g. similar in the gradient domain, and any misalignment will increase the sparseness. Further an algorithm may be applied to the input images based on an Augmented Lagrange Multiplier (ALM) method to increment the registration parameters to find a registration with minimum gradient error. Multiple image registration in the gradient domain may be robust across a wide range of image registration applications with intensity artifacts and intensity outliers.

Figure 1:
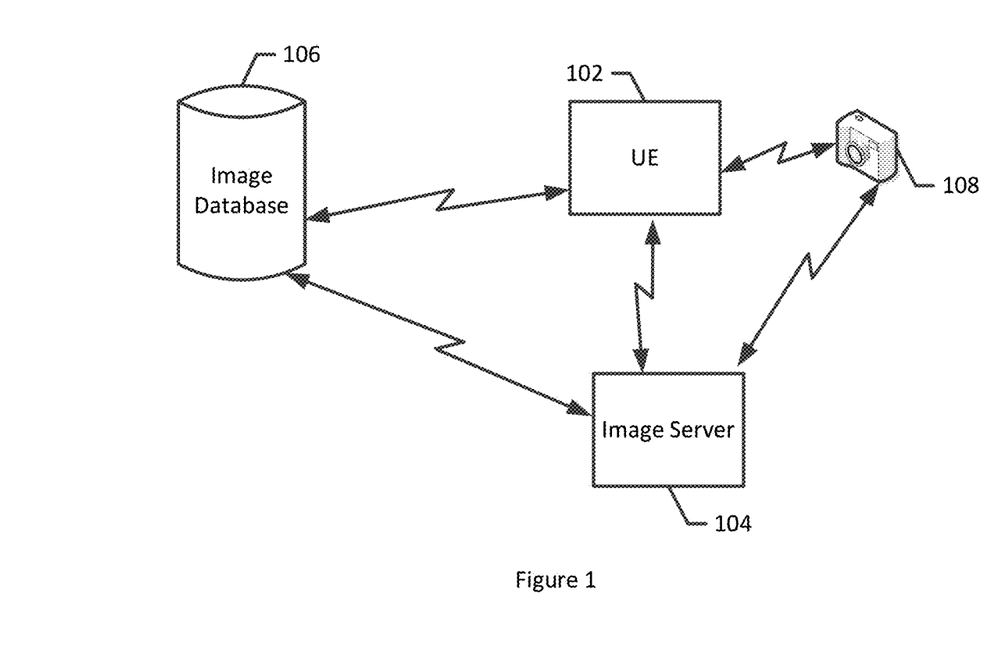
FIG. 1 illustrates a communications diagram in accordance with an example embodiment of the present invention.

A method, apparatus and computer program product are provided in accordance with an example embodiment for image registration in the gradient domain. FIG. 1 illustrates a communication diagram including, an image server 104 in data communication with a user equipment (UE) 102, image database 106, and an image capture device 108. The communication between devices may be a wired, wireless, or any combination of wired and wireless communication networks, such as cellular, WiFi, internet, local area networks, or the like.

The UE 102 may be a mobile computing device such as a laptop computer, tablet computer, mobile phone, smart phone, navigation unit, personal data assistant, watch, camera, or the like. Additionally or alternatively, the UE 102 may be a fixed computing device, such as a personal computer, computer workstation, kiosk, office terminal computer or system, or the like. The image server 104 may be one or more fixed or mobile computing devices. The UE 102 and/or the image server 104 may be in data communication with or otherwise associated with an image capture device 108, e.g. camera.

The image capture device 108 may be a portion of the UE 102 or otherwise associated with the UE or image server 104. The image capture device 108 may be a fixed image camera, a video camera, magnetic resonance imager, X-ray imager, or the like capable of capturing one or more images of an object. The image may be an aerial image, e.g. an image captured from a substantially downward observation point, such as a satellite image or aerial photography from a plane, a portrait image of a specific object in the image frame, or a landscape image captured from a substantially horizontal observation point relative to the object. The images may be directly stored in the image server 104 or UE 102 or transmitted to the image server 104 for later processing.

The UE 102 or image server 104 may receive one or more images from the camera 108 or from the image database 106. The images may include one or more objects, such as buildings, streets, organs, people, animals, or the like.

The UE 102 or image server 104 may receive three or more input images, such as grayscale images $I_1, I_2, \ldots, I_N$ to be registered, where N denotes the total number of images, and where each image L has a width w in pixels, and a height h in pixels.

The UE 102 or image server 104 may determine first parameter values for a first image registration. The parameter values may be transformation, deformation, and/or regularization values to be applied to the input images. In some example embodiments, the parameter values of the first image registration may be default values, such as zero, as it may be assumed that each of the input images are identical and an approximate registration solution determined from a set of transformations $\tau = \{\tau_1, \tau_2, \ldots, \tau_N\}$, with default values. The transformation or deformation may be affine, non-rigid, or the like. One of ordinary skill in the art would immediately recognize and understand that other values may be used, such as a transform, deformation, and/or regularization estimates, based on other registration algorithms, such as the residual complexity (RC) algorithm, optic flow, or the prior knowledge of the end-user. The transformation or deformation may be applied to all of the input images or all of the input images with the exception of $I_1$, e.g. a fixed image.

The locations of the image gradients, e.g. edges may stay substantially stationary relative to each other in an image, even under spatially varying intensity distortions. The UE 102 or image server 104 may register the input images in the gradient domain. In an instance in which the images are not properly aligned, "ghost lines" may appear in the resultant composite image, e.g. the edges of the composite image will be less sparse.

The UE 102 or image server 104 may register the input images by applying an energy minimization function to the input images, such as the following equation.

$$\min_{A,E,\tau} \|A\|_* + \lambda \|E\|_1, \text{subject to } \nabla D \circ \tau = A + E, \quad (1)$$

where $\nabla D \circ \tau = [\text{vec}(I_1^0), \text{vec}(I_2^0), \ldots, \text{vec}(I_N^0)]$ is an M by N real matrix, vec(x) denotes vectorizing the image x, $$\nabla D = \sqrt{(\nabla_x D)^2 + (\nabla_y D)^2}$$

denotes the gradient along two spatial directions; $\text{vec}(I_t^0)$ denotes image $I_t$ warped by transformation or deformation $\tau_t$ for $t=1, 2, \ldots, N$, A represents the aligned input images and E denotes the sparse error. In an example embodiment, it may be assumed that that the intensity distortion fields of natural images change smoothly. Based on the first order Taylor expansion, the equation (1) can be rewritten as:

$$\min_{A,E,\Delta\tau} \|A\|_* + \lambda \|E\|_1,$$

subject to $\nabla D \circ \tau = \sum_{i=1}^n J_t \Delta \tau_t \epsilon_i \epsilon_i^T = A + E$ (2)

The registration of the input images using the energy minimization function may identify and match the gradients of the input images in the composite image and generate a gradient energy or gradient error which may be mapped to a sparcity matrix. An optimization algorithium, e.g. a contrained optimization algorithium, may be applied, such as a low rank approximation, in which the cost function measures the fit between the given sparcity matrix data, e.g. the gradient error and an approxamating matrix, e.g. the optimization variable, such as a zero or near zero gradient error, or maximum sparcity.

In an example embodiment, the UE 102 or image server 104 may determine if the gradient error satisfies a predetermined minimization value.

In an instance in which the gradient error satisfies, e.g. is equal to or less than a predetermined minimization value, such as zero or $10^{-5}$ (pixels), the UE 102 or image server 104 may output the composite image.

In an instance in which the UE 102 or image server 104 determines that the gradient error does not satisfy the predetermined minimization value, the UE or image server may apply an optimization algorithm.

In an example embodiment, the optimization algorithm, such as the augmented Lagrange multiplier (ALM) algorithm may be used to solve the constrained problem. The augmented Lagrangian problem may iteratively update A, E, $\Delta\tau$ and Y by $$(A^{k+1}, E^{k+1}, \Delta\tau^{k+1}) = \arg\min_{A,E,\Delta\tau} L(A, E, \Delta\tau, Y),$$

$$Y^{k+1} = Y^k + \mu^k h(A^k, E^k, \Delta\tau^k) \quad (3)$$

where k is the iteration counter and $$L(A, E, \Delta\tau, Y) = \langle Y, h(A, E, \Delta\tau) \rangle + \|A\|_* + \lambda\|E\|_1 + \mu/2 \|h(A, E, \Delta\tau)\|_F^2 \quad (4)$$

$$h(A, E, \Delta\tau) = \nabla D \circ \tau + \sum_{i=1}^n J_t \Delta\tau_t \epsilon_i \epsilon_i^T - A - E \quad (5)$$

In an example embodiment, the UE 102 or image server 104 may minimize the function against one unknown at one time. Each of the sub-problems may have a closed form solution:

$$\begin{cases} [U, \Sigma, V] = svd\left(\nabla D \circ \tau + \sum_{i=1}^n J_t \nabla \tau_t \epsilon_i \epsilon_i^T + \frac{1}{\mu^k} Y^k - E^k\right) \\ A^{k+1} = U T_{\frac{1}{\mu^k}}(\Sigma) V^T \\ E^{k+1} = T_{\frac{\lambda}{\mu^k}}\left(\nabla D \circ \tau + \sum_{i=1}^n J_t \nabla \tau_t \epsilon_i \epsilon_i^T + \frac{1}{\mu^k} Y^k - A^{k+1}\right) \\ \nabla \tau_t^{k+1} = \sum_{i=1}^n J_t^+\left(A + E + D \circ \tau - \frac{1}{\mu_k} Y_k\right) \epsilon_i \epsilon_i^T \end{cases} \quad (6)$$

where the $T_\alpha$ denotes the soft thresholding operation with threshold value $\alpha$.

$$T_\alpha = \text{sign}(x)\max(|x| - \alpha, 0) \quad (7)$$

The registration algorithm for multiple input images is summarized in Algorithm 1. Let M=w×h be the number of pixels of each image. In an example embodiment, $$\lambda = \frac{1}{\sqrt{M}}$$

and $\mu_k = 1.25^k \mu_0$, where $$\mu_0 = \frac{1.25}{\|\nabla D\|_2}.$$

The UE 102 or the image server 104 may increment the transformation, deformation, or regularization parameters values for a second image registration. For example the UE or image server may increase or decrease values of the transformation, deformation, and/or regularization parameters based on the ALM algorithm. The UE 102 or image server 104 may determine a minimized A, E, and/or $\Delta \tau$, and update the transformation, deformation, and/or regularization values for the input images.

The UE 102 or image server 104 may register the input images using the second image registration parameters by applying Equations 1 and 2. The UE 102 or image server 104 may then determine the gradient error associated with the second image registration.

The UE 102 or image server 104 may determine if the gradient error satisfies the predetermined minimization value. In an instance in which the gradient error satisfies the predetermined minimization value, the UE 102 or image server 104 may output the composite image. In an instance in which the gradient error fails to satisfy the predetermined minimization value, the UE 102 or image server 104 may compare the gradient error of the first image registration to the gradient error of the second image registration.

In an instance in which the gradient error between the first image registration and second image registration satisfies the predetermined gradient change value, e.g. the gradient error has not changed or changed less than a predetermined gradient change value, the UE 102 or image server 104 may determine that the gradient error has been minimized and output the composite image. In an instance in which the gradient error between the first image registration and the second image registration fails to satisfy the predetermined gradient change value, e.g. the gradient error has changed or has changed greater than the predetermined gradient change value, the UE 102 or image server 104 may increment the transformation or deformation parameters, based on equations 3-7 and repeat the registration and comparison of gradient errors.

The process may repeat until the UE 102 or image server 104 determines the gradient error of the second image registration satisfies the predetermined minimization value or the change in gradient error satisfies the predetermined gradient change value, e.g. a stop criteria is met. In an instance in which a stop criterion is met, the UE 102 or image server 104 may output the composite image.

In an example embodiment, the multiple image registration in the gradient domain may be applied as follows:

Input: $I_1, \ldots, I_N$ are the two dimensional (2D) images.
$\tau_1, \ldots, \tau_N$ are initial values for transformation parameters.
$\lambda$ is the regularization parameter from equation (1).
Output: The transformation parameter $\tau$, aligned images A and registration sparcity error E.
Repeat
(1) Compute $$J_t = \frac{\partial}{\partial \zeta}(\nabla I_t \circ \zeta)\Big|_{\zeta=\tau_t}, t = 1, \ldots, N;$$

(2) Warp and normalize the gradient images:

$$\nabla D \circ \tau = \left[\frac{\nabla I_1 \circ \tau_1}{\|\nabla I_1 \circ \tau_1\|_F}; \ldots ; \frac{\nabla I_N \circ \tau_N}{\|\nabla I_N \circ \tau_N\|_F}\right];$$

(3) Use (6) to iteratively solve the minimization problem of ALM:
(A*, E*, $\Delta\tau$*)=arg min$_{A,E,\Delta\tau}$ L(A, E, $\Delta\tau$, Y),
(4) Update $\tau=\tau+\Delta\tau$*;
Until stop criterions.

The registration of the input images as discussed above, may be performed simultaneously for all of the input images.

Example Apparatus

Figure 2:
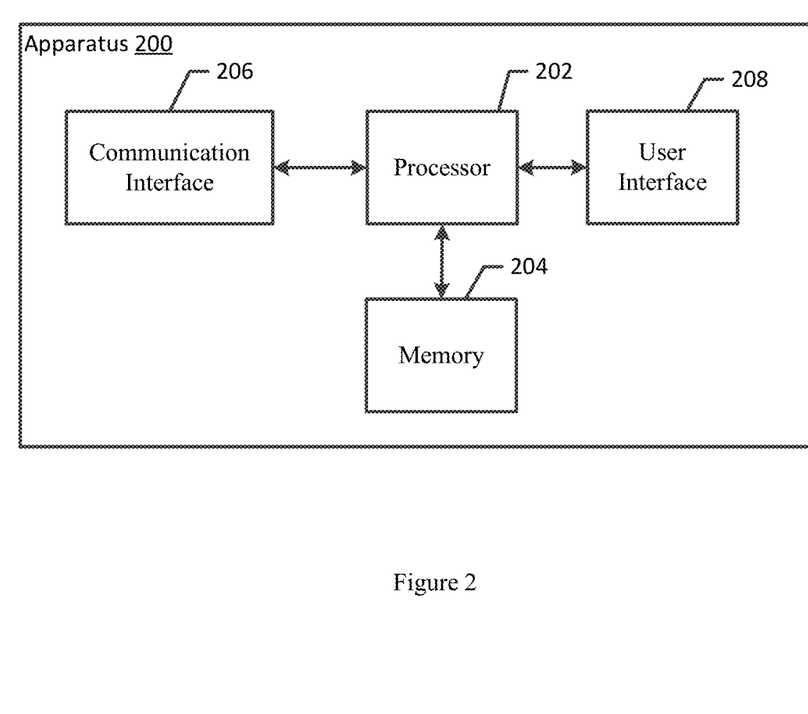
FIG. 2 is a block diagram of an apparatus that may be specifically configured for simultaneous multi-image registration in the gradient domain in accordance with an example embodiment of the present invention.

A UE 102 or image server 104 may include or otherwise be associated with an apparatus 200 as shown in FIG. 2. The apparatus, such as that shown in FIG. 2, is specifically configured in accordance with an example embodiment of the present invention for simultaneous multi image registration in the gradient domain. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by a UE 102 or an image server 104. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 104, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

In some example embodiments, the apparatus may include an image capture device, such as the image capture device 108 described in FIG. 1.

Example Comparison of Image Registration with Intensity Variation

Figure 3:
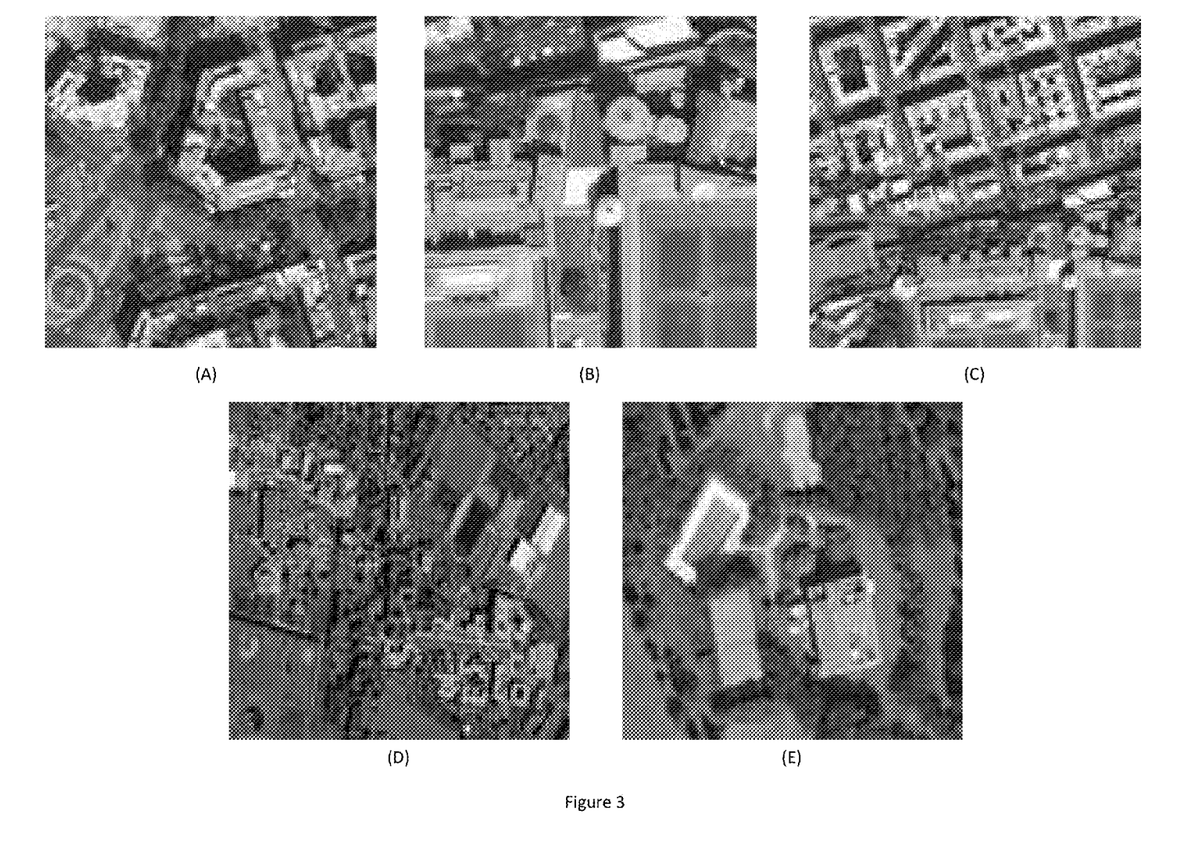
FIG. 3 illustrates example input images in accordance with an example embodiment of the present invention.

FIG. 3 illustrates representative input images in accordance with an example embodiment of the present invention. The first image, such as input image A may be fixed and the transformation, deformations, and/or regularizations applied to the remaining input images, e.g. input images B-E. In some example embodiments, the input image with the largest area, such as geographic area, body area, or the like, may be selected as the fixed input image. In an example embodiment, a user may select the fixed input image.

The input images of FIG. 3 are illustrated to compare the registration algorithms of RASL, t-GRASTA, and the registration of multiple images in the gradient domain in accordance with an example embodiment of the present invention. Input images A-E are cropped portions of the same relative area from Quickbird, GeoEye and DigitalGlobe. The input images have been modified by adding artificial translation and light. The translation is drawn randomly from a uniform distribution.

For each test case, represented by FIGS. 2-8, eight misaligned input images, similar to the representative input images of FIG. 1, are used. Registration algorithms are then applied to register the input images; the registration algorithms include RASL, t-GRASTA, and multiple image registration in the gradient domain (MIRGD).

Table 1 shows the quantitative comparisons on the test images over 20 random runs. Table 1 depicts the mean/max registration errors in pixels of RASL, t-GRASTA and the MIRGD. The overall average errors of MIRGD are consistently lower than those of RASL and t-GRASTA. More importantly, MIRDG achieves subpixel accuracy.

TABLE 1

|  | RASL | t-GRASTA | MIRGD |
| --- | --- | --- | --- |
| DigitalGlobe 1 | 0.017/0.036 | 1.675/2.974 | 0.003/0.005 |
| DigitalGlobe 2 | 0.019/0.049 | 0.706/2.775 | 0.010/0.017 |
| DigitalGlobe 3 | 0.011/0.027 | 1.588/4.588 | 0.005/0.013 |
| GeoEye | 0.021/0.045 | 1.650/4.352 | 0.008/0.020 |
| Quickbird | 0.018/0.040 | 0.915/3.360 | 0.007/0.011 |

Figure 4:
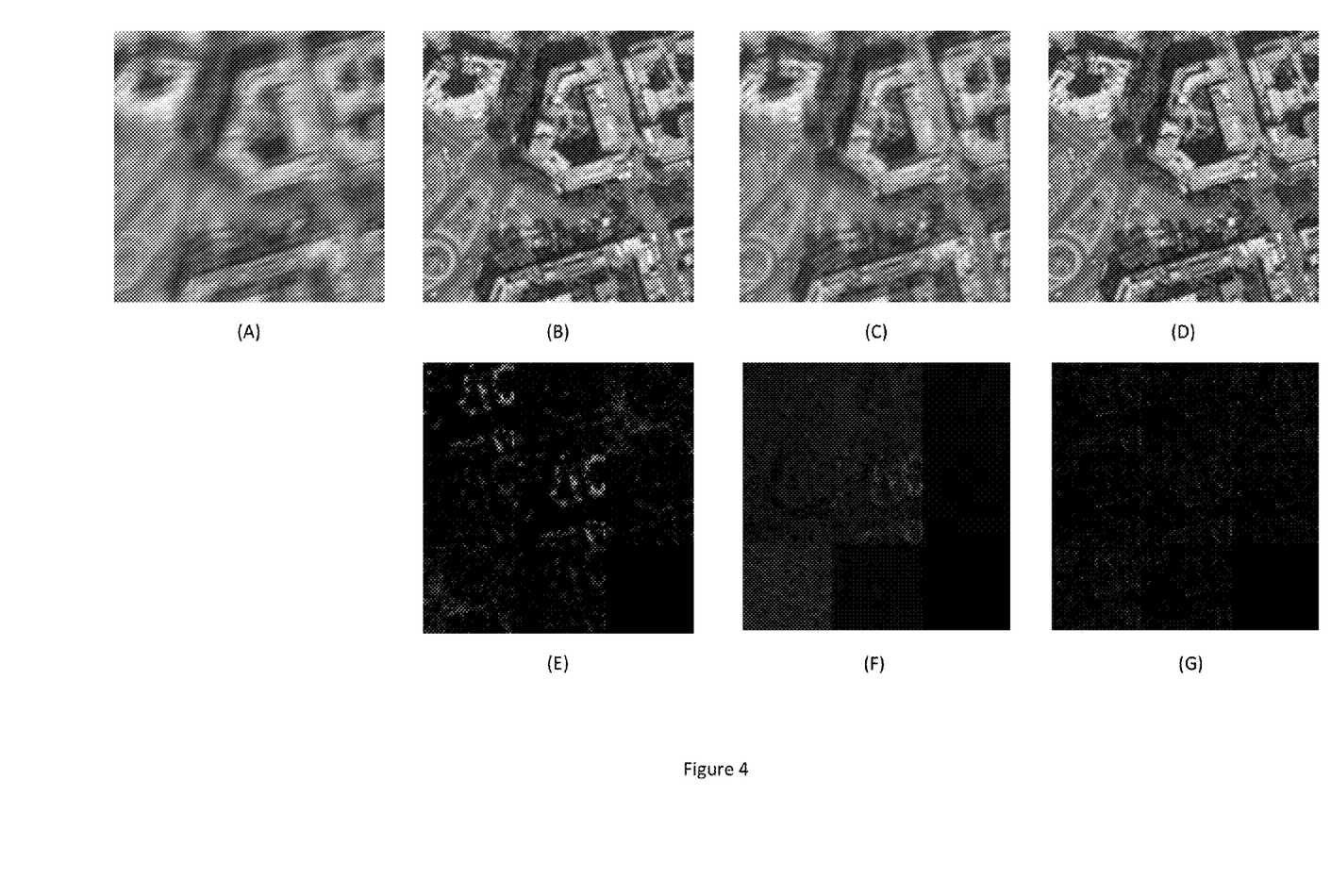
FIGS. 4-8 illustrate a comparison of image registration methods with intensity variation.
Figure 5:
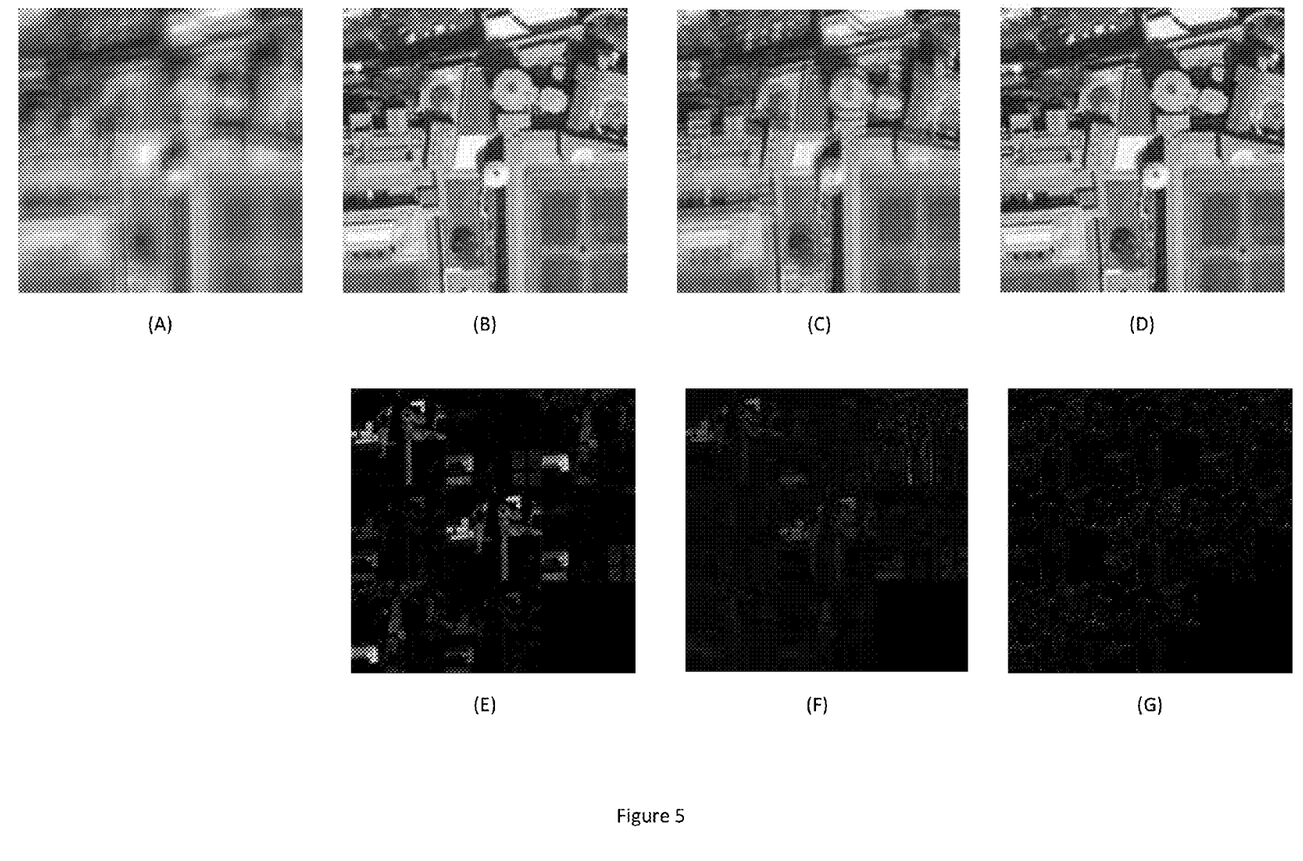
Figure 6:
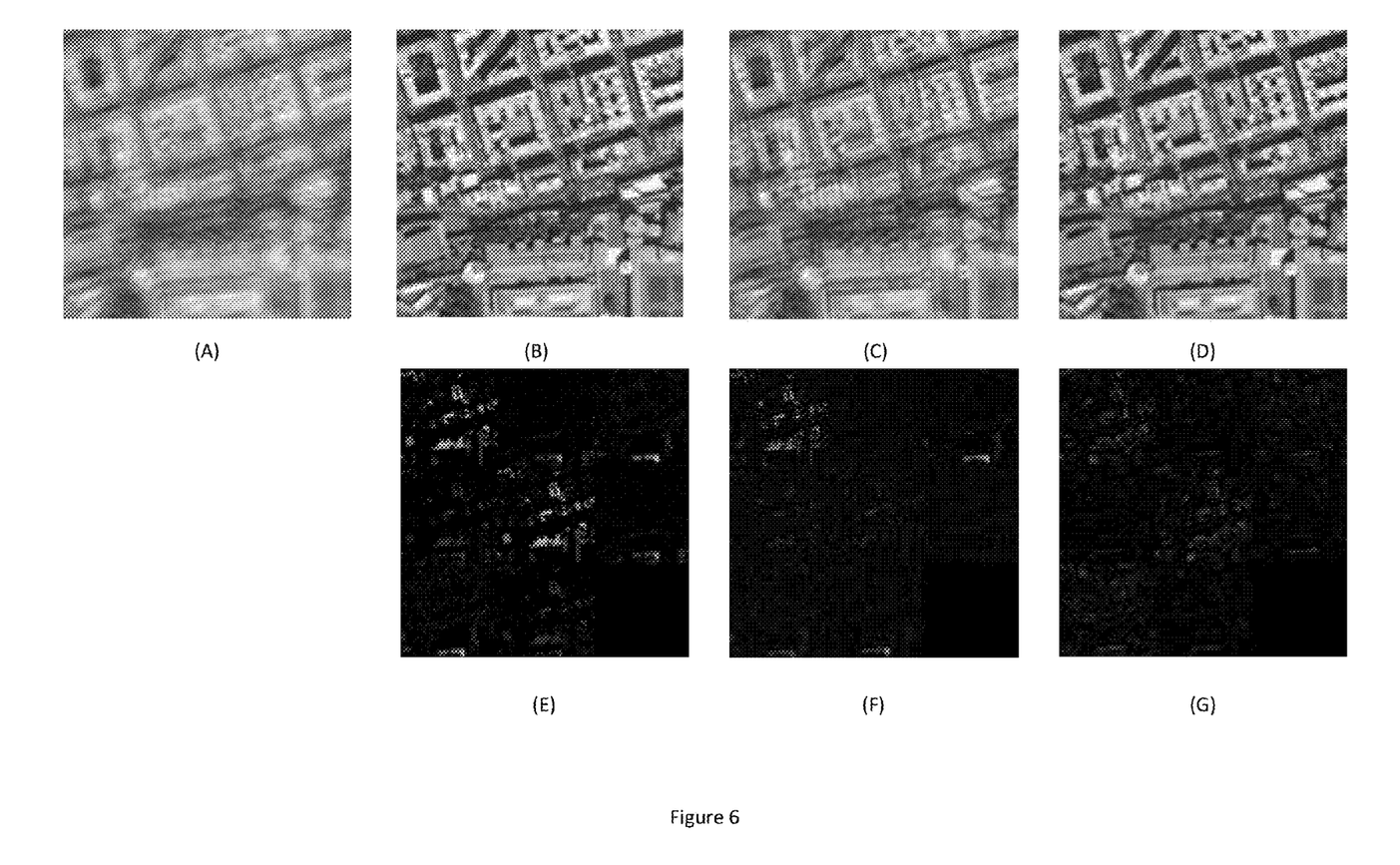
Figure 7:
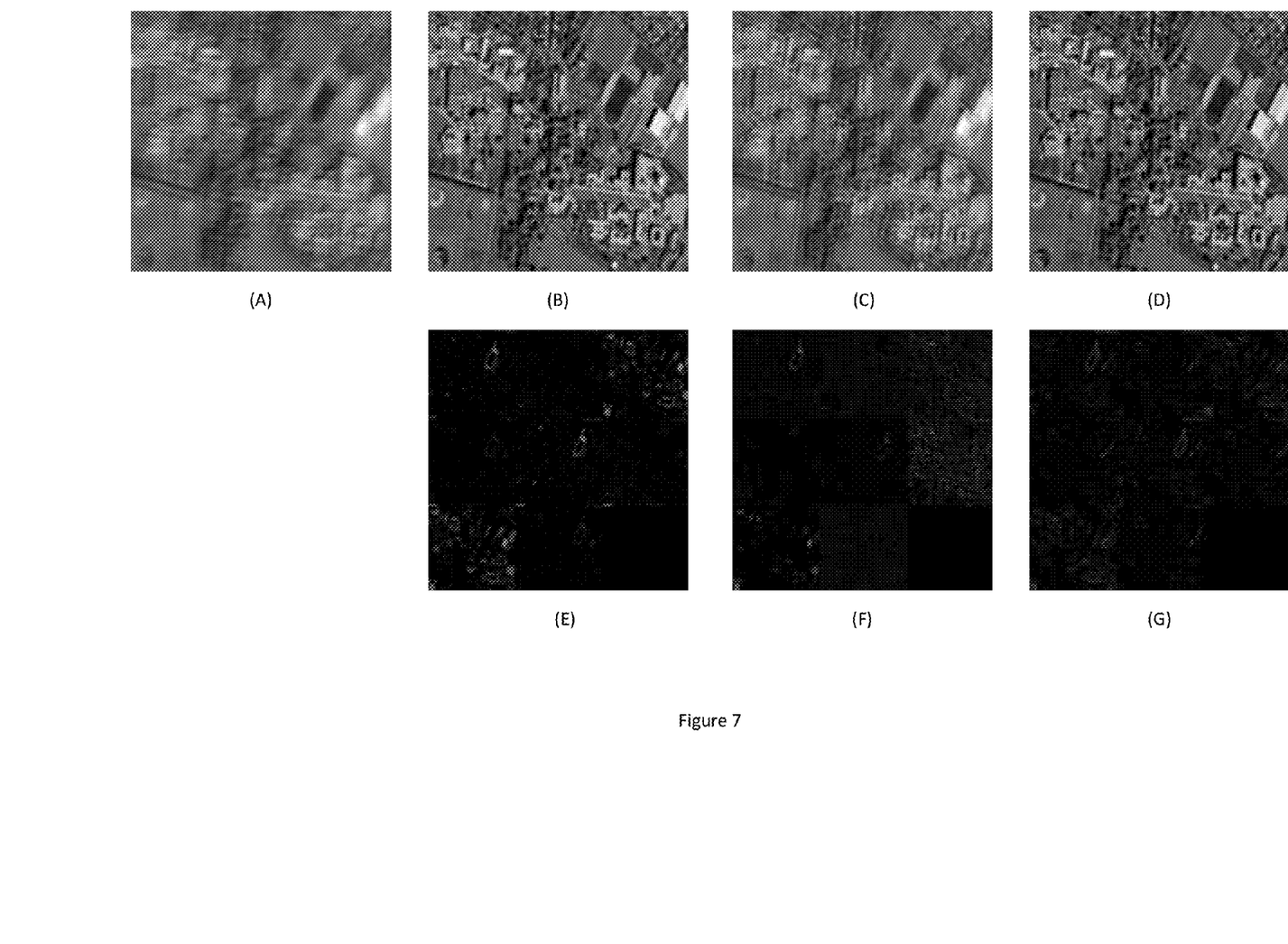
Figure 8:
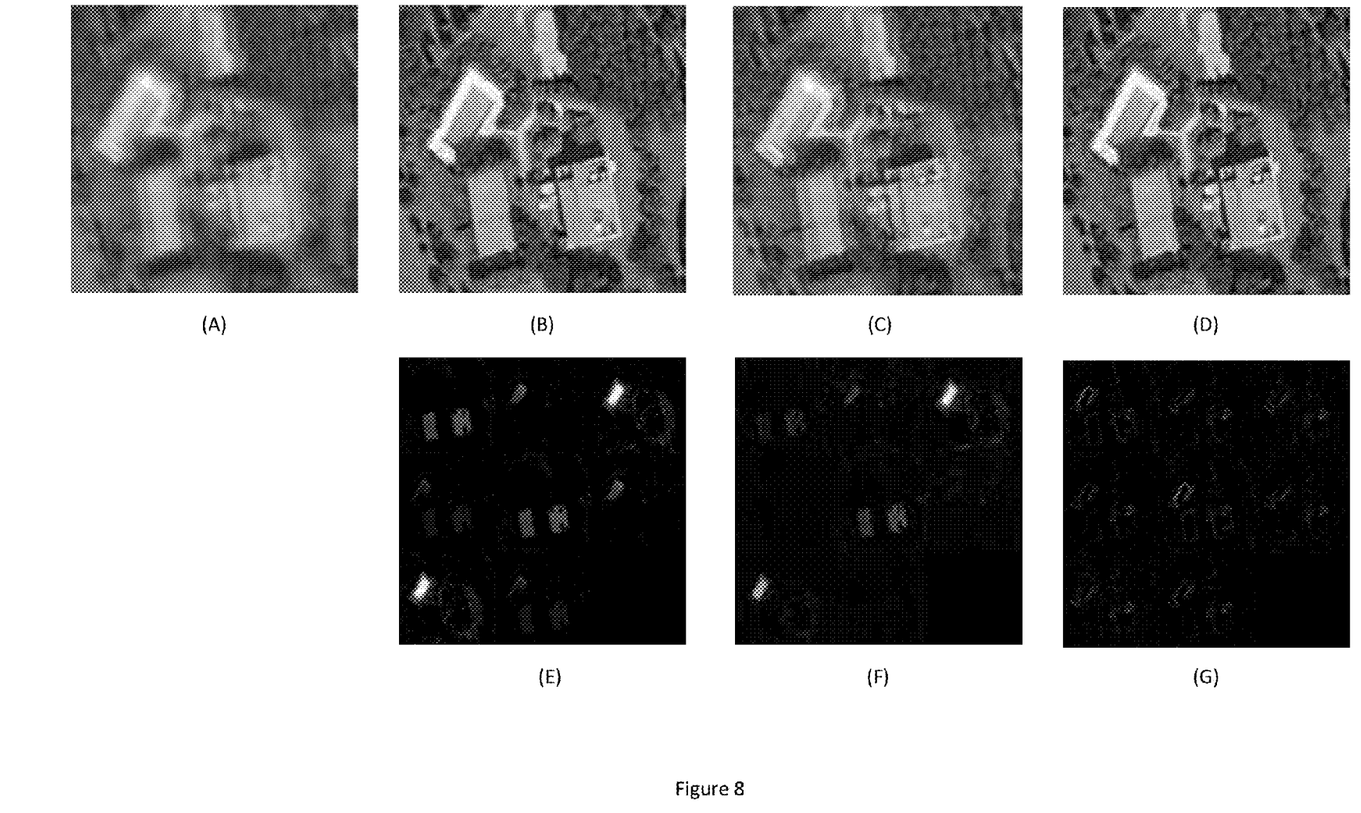

FIG. 4-8 depict comparative registration results from different datasets. Image A of FIG. 4 depicts the average image of the input images, in which a misalignment is observed and the resultant image is extremely blurry. Images B-D depict the composite images of the registration results of RASL, t-GRASTA and MIRGD. The composite images are much clear than that of image A. Within the composite images B-D, the composite image D by MIRGD has significantly sharper edges than those produced by the RASL or t-GRASTA methods.

Images E-G depict the sparse errors output by the RASL, t-GRASTA and MIRDG methods, respectively, where RASL and t-GRASTA fail to separate the shadows and have large errors, and therefore, mistake many good pixels in error, while MIRDG successfully finds the optimal registration of the images. Similar trends are depicted in FIGS. 5-8.

Figure 9:
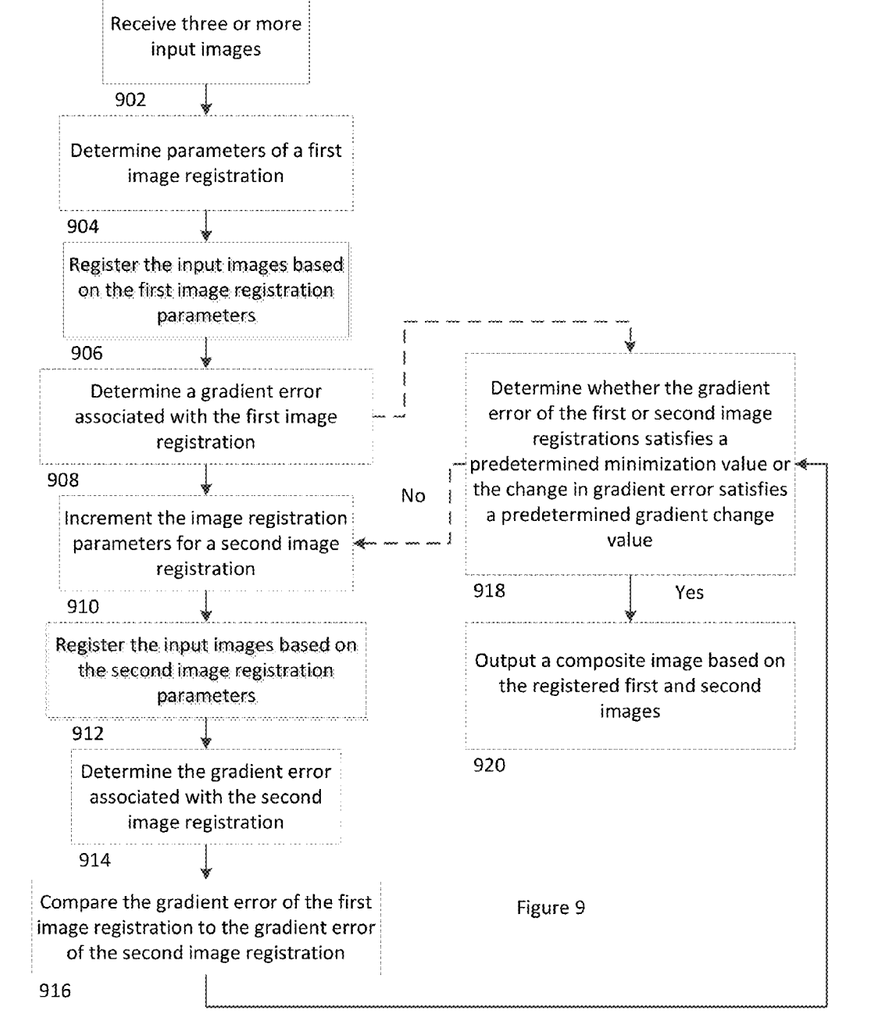
FIG. 9 illustrates an example process for simultaneous multi-image registration in the gradient domain in accordance with an embodiment of the present invention.

Example Process for Simultaneous Multiple Image Registration in the Gradient Domain Referring now to FIG. 9, the operations performed, such as by the apparatus 200 of FIG. 2, for simultaneous multiple image registration in the gradient domain are illustrated. As shown in block 902 of FIG. 9, the apparatus 200 may include means, such as a processor 202, memory 204, a communications interface 206, or the like, configured to receive input images. The processor 202 may receive the input images from the communications interface 206, which may in turn receive the input images from a memory 204, such as an image database 106, or from an image capture device 108.

The input images may be aerial images, e.g. an image captured from a substantially downward perspective, such as a satellite image, portrait images of a specific object in the image frame, or landscape images captured from a substantially horizontal observation point relative to the object. The input images may include at least a portion of an object in each image.

As shown in block 904 of FIG. 9, the apparatus 200 may include means, such as a processor 202, or the like, configured to determine parameters of a first image registration. The parameter values may be transformation, deformation, and/or regularization values to be applied to the input images. In some example embodiments, the parameter values for the first image registration may be default values, such as zero. In some example embodiments, the parameter values for the first image registration may be estimated based on other registration methods, user input, or the like.

As shown at block 906 of FIG. 9, the apparatus 200 may include means, such as a processor 202, or the like, configured to register the input images based on the first image registration parameter values. In an example embodiment, the processor 202 may registrar the input images in the gradient domain. In some example embodiments, the processor 202 may simultaneously register the input images by applying an energy minimization function $\min_{A,E,\tau}$ to the input images, such as Equations 1 and 2.

As shown at block 908 of FIG. 9, the apparatus 200 may include means, such as a processor 202, or the like, configured to determine a gradient error associated with the first image registration. The processor 202 may determine a gradient error based on Equations 1 and 2.

The process may continue at block 910 with the apparatus 200 including means, such as the processor 202 or the like, for incrementing the image registration parameters for subsequent image registration. In an example embodiment, the apparatus 200 further includes means, such as the processor 202 or the like, for determining if the gradient error satisfies a predetermined minimization value. See block 918. In an instance in which the gradient error satisfies the predetermined minimization value the process may continue to block 920 without necessarily performing blocks 910-916.

As shown at block 910 of FIG. 9, the apparatus 200 may include means, such as a processor 202, or the like, configured to increment the image registration parameters for a second image registration. The processor 202 may increment the transformation or deformation parameters and/or the regularization value for a second image registration, for example the processor may increase or decrease the transformation, deformation, and/or the regularization parameters based on the ALM algorithm. The processor 202 may determine a minimized A, E, and/or $\Delta\tau$, and update the transformation, deformations, and/or regularization values for the input images.

As shown at block 912 of FIG. 9, the apparatus 200 may include means, such as a processor 202, or the like, configured to register the input images based on the second image registration parameters. The second image registration may be substantially similar to the image registration of block 906.

As shown at block 914 of FIG. 9, the apparatus 200 may include means, such as a processor 202, or the like, configured to determine a gradient error associated with the second image registration. Determining the gradient error associated with the second image registration may be substantially similar to determining the gradient error associated with the first image registration of block 908.

As shown in block 916 of FIG. 9, the apparatus 200 may include means, such as a processor 202, or the like, configured to compare the gradient error associated with the first image registration and the gradient error associated with the second image registration.

As shown in block 918 of FIG. 9, the apparatus 200 may include means, such as a processor 202, or the like, configured to determine whether the gradient error of the first of second image registration satisfies a predetermined minimization value or if the change in gradient error between the first image registration and the second image registration, as determined by block 916, satisfies a predetermined minimization value.

The processor 202 may compare the gradient error of the first image registration, as determined from block 908, to a predetermined minimization value. In the event that the gradient error associated with the first image registration satisfies the predetermined minimization value, the processor 202 may output the composite image in block 920 without performance of blocks 910-916.

In an instance in which the first gradient error fails to satisfy the predetermined minimization value, the processor 202 may perform blocks 910-916. The processor 202 may compare the gradient error of the second image registration to the predetermined minimization value In the event that the gradient error associated with the second image registration satisfies the predetermined minimization value, the processor 202 may output the composite image in block 920.

The processor 202 may determine if the gradient error satisfies, e.g. is less than the predetermined minimization value, such as zero or $10^{-5}$ (pixels).

In an instance in which the gradient error fails to satisfy the predetermined minimization value the processor 202 may compare the gradient error of the first image registration to the gradient error of the second image registration.

In an instance in which the gradient error between the first image registration and second image registration satisfies the predetermined gradient change value, e.g. the gradient error has not changed or changed less than a predetermined gradient change value, the processor 202 may determine that the gradient error has been minimized and output the composite image at block 920. In an instance in which the gradient error between the first image registration and the second image registration fails to satisfy the predetermined gradient change value, e.g. the gradient error has changed or has changed greater than the predetermined gradient change value, the processor 202 may repeat blocks 910-918, e.g. increment the transformation, deformation, and/or regularization parameter values and repeat the registration and comparison of gradient errors.

As shown in block 920 of FIG. 9, the apparatus 200 may include means, such as a processor 202, memory 204, communications interface 206, user interface 208, or the like, configured to output a composite image based on the registered input images. The processor 202 may output the composite image to a memory 204. In some example embodiments the processor may cause the communications interface to transmit the composite image to a memory 204, such as the image database 106 or other devices, such as UE 102. In some example embodiments, the processor 202 may cause the composite image to be displayed on a user interface 208.

Multiple image registration in the gradient domain may allow for greater accuracy and robustness of the composite images than composite images generated using registration based on intensity similarity, especially in instances which include illumination changes, color distortion, occlusions, or the like. Simultaneous multi image registration in the gradient domain may also reduce computation needed for intensity based image registration using a similarity measure.

As described above, FIG. 9 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 904 and 908-920 in FIG. 9. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving three or more input images; and
   registering, simultaneously, the three or more input images in a gradient domain based on applying an energy minimization function, wherein registering the input images in the gradient domain comprises:
      determining registration parameters for each of the input images, for a first image registration;
      registering the input images based on the registration parameters;
      determining a gradient error associated with the first image registration;
      determining if the gradient error associated with the gradient error satisfies a predetermined minimization value; and
      generating a composite image, in an instance in which the gradient error satisfies the predetermined minimization value.

2. The method of claim 1, wherein the energy minimization function is based on a low-rank approximation and sparsity.

3. The method of claim 1, wherein the registering the input images in the gradient domain further comprises:
   incrementing the registration parameters for a second image registration;
   registering the input images based on the incremented registration parameters;
   determining the gradient error associated with the second image registration;
   comparing the gradient error of the first image registration to the gradient error of the second image registration;
   determining if a change in the gradient error between the first image registration and the second image registration satisfies a predetermined gradient change value; and
   generating a composite image in an instance in which the change in gradient error satisfies the predetermined gradient change value.

4. The method of claim 3, wherein the registering the input images in the gradient domain further comprises:
   reperforming the incrementing the registration parameters, registering the input images;
   determining the gradient error; and comparing the gradient errors.

5. The method of claim 1, wherein the gradient error comprises a sparse error.

6. The method of claim 1, wherein the registration of the input images in the gradient domain is based on an augmented Lagrange algorithm.

7. An apparatus comprising at least one processor and at least one memory including computer program code, the at least one memory and computer program code configured to, with the processor, cause the apparatus to at least:
   receive three or more input images; and
   register, simultaneously, the three or more input images in a gradient domain based on applying an energy minimization function, wherein registering the input images in the gradient domain comprises:
      determining registration parameters for each of the input images, for a first image registration;
      registering the input images based on the registration parameters;

determining a gradient error associated with the first image registration;

determining if the gradient error associated with the gradient error satisfies a predetermined minimization value; and generating a composite image, in an instance in which the gradient error satisfies the predetermined minimization value.

8. The apparatus of claim 7, wherein the energy minimization function is based on a low-rank approximation and sparsity.

9. The apparatus of claim 7, wherein the registering the input images in the gradient domain further comprises:

incrementing the registration parameters for a second image registration;

registering the input images based on the incremented registration parameters;

determining the gradient error associated with the second image registration;

comparing the gradient error of the first image registration to the gradient error of the second image registration;

determining if a change in the gradient error between the first image registration and the second image registration satisfies a predetermined gradient change value; and generating a composite image in an instance in which the change in gradient error satisfies the predetermined gradient change value.

10. The apparatus of claim 9, wherein the registering the input images in the gradient domain further comprises:

reperforming the incrementing the registration parameters, registering the input images;

determining the gradient error; and comparing the gradient errors.

11. The apparatus of any claim 7, wherein the gradient error comprises a sparse error.

12. The apparatus of claim 7, wherein the registration of the input images in the gradient domain is based on an augmented Lagrange algorithm.

13. A non-transitory computer program product comprising at least one non-transitory computer-readable storage medium having computer-executable program code portions stored therein, the computer-executable program code portions comprising program code instructions configured to:

receive three or more input images; and register, simultaneously, the three or more input images in a gradient domain based on applying an energy minimization function, wherein registering the input images in the gradient domain comprises:

determining registration parameters for each of the input images, for a first image registration;

registering the input images based on the registration parameters;

determining a gradient error associated with the first image registration;

determining if the gradient error associated with the gradient error satisfies a predetermined minimization value; and generating a composite image, in an instance in which the gradient error satisfies the predetermined minimization value.

14. The computer program product of claim 13, wherein the energy minimization function is based on a low-rank approximation and sparsity.

15. The computer program product of claim 13, wherein the registering the input images in the gradient domain further comprises:

incrementing the registration parameters for a second image registration;

registering the input images based on the incremented registration parameters;

determining the gradient error associated with the second image registration;

comparing the gradient error of the first image registration to the gradient error of the second image registration;

determining if a change in the gradient error between the first image registration and the second image registration satisfies a predetermined gradient change value; and generating a composite image in an instance in which the change in gradient error satisfies the predetermined gradient change value.

16. The computer program product of claim 15, wherein the registering the input images in the gradient domain further comprises:

reperforming the incrementing the registration parameters, registering the input images;

determining the gradient error; and comparing the gradient errors.

17. The computer program product of claim 13, wherein the gradient error comprises a sparse error.

* * * * *